US005897773A

United States Patent [19]
Rhodes

[11] Patent Number: 5,897,773
[45] Date of Patent: Apr. 27, 1999

[54] SKIMMING APPARATUS

[76] Inventor: Laurence Mark Rhodes, 11825 Grande Vista Dr., Whittier, Calif. 90601

[21] Appl. No.: 08/998,541

[22] Filed: Dec. 26, 1997

Related U.S. Application Data

[60] Provisional application No. 60/037,026, Jan. 31, 1997.
[51] Int. Cl.$^6$ .............................. B01D 21/00; C02F 1/40
[52] U.S. Cl. .................. 210/232; 210/242.1; 210/242.3; 210/249; 210/258; 210/923
[58] Field of Search ................................ 210/232, 243.2, 210/249, 258, 523, 525, 513, 242.1, 923

[56] References Cited

U.S. PATENT DOCUMENTS

| 612,791 | 1/1898 | Winkel | 210/540 |
|---|---|---|---|
| 665,841 | 1/1901 | Winkel | 210/519 |
| 762,486 | 6/1904 | McClelland | 210/519 |
| 782,065 | 2/1905 | Shaler | 210/540 |
| 1,647,808 | 11/1927 | Neumann | 210/242.1 |
| 2,285,893 | 6/1942 | Boosey | 210/519 |
| 2,755,933 | 7/1956 | Profit | 210/538 |
| 2,878,944 | 3/1959 | Barnes | 210/540 |
| 3,568,836 | 3/1971 | Ray | 210/242.1 |
| 3,844,743 | 10/1974 | Jones | 55/DIG. 5 |
| 3,849,308 | 11/1974 | Westerman | 210/98 |
| 4,011,158 | 3/1977 | Cook | 210/DIG. 25 |
| 4,266,429 | 5/1981 | Brovold | 73/864.63 |
| 4,422,931 | 12/1983 | Wolde-Michael | 210/540 |
| 4,431,536 | 2/1984 | Thompson | 210/123 |
| 4,457,849 | 7/1984 | Heinze et al. | 210/807 |
| 4,581,181 | 4/1986 | Nicholls | 210/242.1 |
| 4,663,037 | 5/1987 | Breslin | 210/170 |
| 4,722,800 | 2/1988 | Aymong | 210/802 |
| 4,869,236 | 9/1989 | Blough | 126/540 |
| 4,954,266 | 9/1990 | Lingo, Jr. | 210/747 |
| 5,053,145 | 10/1991 | Ellison | 210/776 |
| 5,240,560 | 8/1993 | Gregory | 159/16.1 |
| 5,279,748 | 1/1994 | Hackett | 210/757 |
| 5,286,383 | 2/1994 | Verret et al. | 210/DIG. 5 |
| 5,601,705 | 2/1997 | Glasgow | 210/104 |
| 5,730,872 | 3/1998 | Rhodes | 210/519 |

FOREIGN PATENT DOCUMENTS

| 56-15807 | 2/1981 | Japan . | |
|---|---|---|---|
| 2024030 | 1/1980 | United Kingdom | 210/242.3 |

OTHER PUBLICATIONS

ITW Fluid Products Group, Rustlick SC3000 Coolant Skimmer advertisement, p. 8.
Midbrook Products, Inc., Mini–Extractor advertisement; 1993; 1995 (3 pp).
Master Chemical Corporation, Master Coalescer advertisement; 1992 (2 pp.).
Hangsterfer's CPS Jr. Tramp Oil Removal System advertisement; Feb. 1994 (4 pp.).
Great Lakes Environmental Slant Rib Coalescing Oil Separator advertisement; GLE Bulletin 100.89; 1989 (4 pp.).
CLC Lubricants Co., Product Information. Publication re: Li'L Tramp Skimmer/Aerator; (known to the public before Jan. 1, 1996).
Nordale Incorporated, "Nordale Fluid Eliminator," Model 1000, Publication No. 1–10781, Jul. 1981, 8 pages.

(List continued on next page.)

*Primary Examiner*—Jay H. Woo
*Assistant Examiner*—Fred Prince
*Attorney, Agent, or Firm*—Christie, Parker & Hale, LLP

[57] ABSTRACT

Apparatus for skimming liquid from the surface of a body of liquid which includes a lighter liquid floating on a heavier liquid. The apparatus includes an upwardly opening container having a specific gravity which causes the container to float in the body of liquid with an upper edge of the container in the vicinity of the interface between the lighter and heavier liquids. An elongated suction tube has a lower end extending down into the container. The upper end of the suction tube is connected to a source of suction so liquid is withdrawn from the container through the tube.

11 Claims, 6 Drawing Sheets

OTHER PUBLICATIONS

Yates, "Atmospheric Evaporators," Plating and Surface Finishing, Apr. 1986, pp. 30–32 and "ET–II" Brochure Supplement, 3 pages.

Arkay, "PCX Evaporators and Wash Water Recirculators," Photographic Processing, Feb. 1990, 4 page brochure.

Poly Products Corporation, "Evaporative Tank™ Atmospheric Evaporator for EPA Compliance and Greater Profits," 1991, 2 page brochure.

Solvents On–Site Recycling, Inc., "Solvent Recycling Made Simple," Texas Environmental News, Reprint vol. 3, No. 5, May 1993, 4 pages.

Samsco, Inc., "Water Evaporator," 1994, 4 page brochure.

Landa, Inc., "Water Blaze Evaporators," Form #96–0346, Jan. 1994, 6 page brochure.

Fen–Tech Environmental, Inc., "EVAP–O–DRY," Nov. 1994, 6 pages.

Erickson, "Description of Electrical Controls on the Nordale Fluid Eliminator," Nordale Incorporated Paper No. 91029, 3 pages.

Erickson, et al., "Description of Air Pressure/Fluid Level Monitoring System," Nordale Incorporated Paper No. 911217, 6 pages.

Hydro–Blast, Inc., "Wastewater Evaporation Systems" (Hydro–Vap™), 4 page brochure.

Monitrol, Inc., "The MWE Self–Clean Water Evaporator," 1 page brochure.

Monitrol, Inc., "The LTE Low–Temp Evaporator," 1 page brochure.

Redi Strip Company, "REDiVAP® from Redi Strip," Data Sheet V316–03–90, 1 page brochure.

American Metal Wash, Inc., "Evaporator Model 100 EV," 1 page brochure.

Reduction Technologies, Inc., "Don't let water turn to waste," (RE Series, Evaporators, RG Series and Recyclers), 6 page brochure.

Environmental Management Technologies, Inc., "Stop Burning Up Profit On Hazardous Waste Disposal," (EMTEC Recyclers, Evaporators, Waste Liquid Reducers), 6 page brochure.

Landa, Inc., "New Wastewater Technology," Environmental Solutions, No. 102, 4 page brochure.

SKIMMING APPARATUS

This application claims the benefit of U.S. Provisional Application No. 60/037,026 filed Jan. 31, 1997, now abandoned.

BACKGROUND OF THE INVENTION

This invention relates to apparatus for skimming liquid from the surface of a liquid body which includes two liquids of different densities.

The invention can be used to separate any mixture of liquids which separate under gravity, but it is especially useful in treating water covered by a layer of oil.

"Tramp" oils (hydraulic oils, lubricating oil for mills, lathes, and drill presses, transmission oil, and any other undesirable oil) are a source of many problems associated with wash water used in industrial parts washers, and with water-based coolants (which include a water-miscible organic lubricant) used in machining and grinding operations. The coolants are designed primarily to lubricate and cool the work and the cutting or grinding surfaces of the machine doing the work. The coolants reduce heat build-up during the machining or grinding process, and prevent the burning of parts, reduce distortion in the work piece, extend tool life, and permit faster production.

Machine coolants include oils, emulsifiers, and water-soluble oils to combine the lubrication property of cutting oils with the cooling ability and economy of water. The machine coolants are fairly expensive and, therefore, are recirculated for various machining operations. Wash water used in industrial parts washers is also recirculated to reduce costs. Coolants and wash water pick up various amounts of tramp oil during machining, grinding or washing operations.

Most coolant formulations absorb tramp oil if the two materials remain in intimate contact for a sufficient length of time. Absorbed tramp oil can change the desirable properties of the coolants, thereby negatively affecting tool life, surface finish of work pieces, and skin sensitivity of tool operators. Therefore, it is important to remove tramp oil from coolant formulations promptly and completely to minimize these adverse effects. Prompt and efficient separation of tramp oil from coolant also extends coolant life, improves machining, and minimizes maintenance. It is also important to separate tramp oil from wash water to minimize the amount of water which must be used, and thereby save storage and disposal costs.

A number of skimmers have been developed to separate oil and water mixtures, but most of these are expensive, inefficient or require a large amount of floor space. Previously available skimmers are also difficult to adjust and keep properly adjusted for efficient removal of the separated products for a variety of operating temperatures and materials.

BRIEF SUMMARY OF THE INVENTION

This invention provides a skimmer which is easy and inexpensive to manufacture, requires little space, can be mounted on many existing tanks, and is self-adjusting for various operating conditions.

In brief, this invention provides apparatus for skimming liquid from a body of liquid which includes a lighter liquid floating on a heavier liquid. The skimmer includes an upwardly opening container having a shape and density which causes the container to float in the body of liquid with an upper edge of the container in the vicinity of the interface between the lighter and heavier liquids. An elongated suction tube extends down into the container. The lower end of the tube is open, and means are provided for connecting an upper end of the tube to a source of suction so liquid can be withdrawn from the container through the tube. The upper edge of the container remains in the vicinity of the interface between the two liquids, some of which flows over the edge and into the container for removal through the tube.

In a preferred form of the invention, an upper portion of the container is made of a material which has a specific gravity slightly less than that of water. A lower portion of the container has a specific gravity slightly more than that of water. The two portions are dimensioned and proportioned so that the skimmer floats in the body of liquid with the upper edge of the container in the vicinity of the interface between the two liquids.

In another preferred form of the invention, a lower part of the container includes a orifice which permits some of the heavier liquid to enter the container so that the container always remains substantially full even while liquid is withdrawn from the container through the suction tube. This keeps the skimmer floating at the proper level to position the edge of the container in the vicinity of the interface between the two liquids.

Preferably, the upper portion of the container includes an upwardly opening slot, the bottom of which forms the edge to permit liquid near the interface to flow into the container.

Another preferred form of the invention includes retainer means to prevent the container from slipping down off the lower end of the suction tube as the level of the body of liquid falls. For convenience of construction, the lower portion of the container is an externally threaded piece of conventional polyvinyl chloride pipe, which is about six inches long, and the lower end of which is closed by a ¾" cap having a vertically extending ½" orifice. The upper portion of the container is made of ultra-high molecular weight polyethylene, which has a specific gravity slightly less than that of water. The pipe has a specific gravity about equal to that of water, and the cap has a specific gravity slightly greater than water. The dimensions of the upper and lower portions are such that the assembly floats with part of the upper portion of the skimmer above the body of liquid.

Preferably, the container is elongated in a vertical direction, and has a length at least several times the inside diameter of the container. For convenience, the suction tube is releasably clamped by a bracket adapted to be secured to the side of a tank which holds the two liquids. Thus, the height of the lower end of the suction tube above the tank bottom can be adjusted.

DETAILED DESCRIPTION

Figure 1:
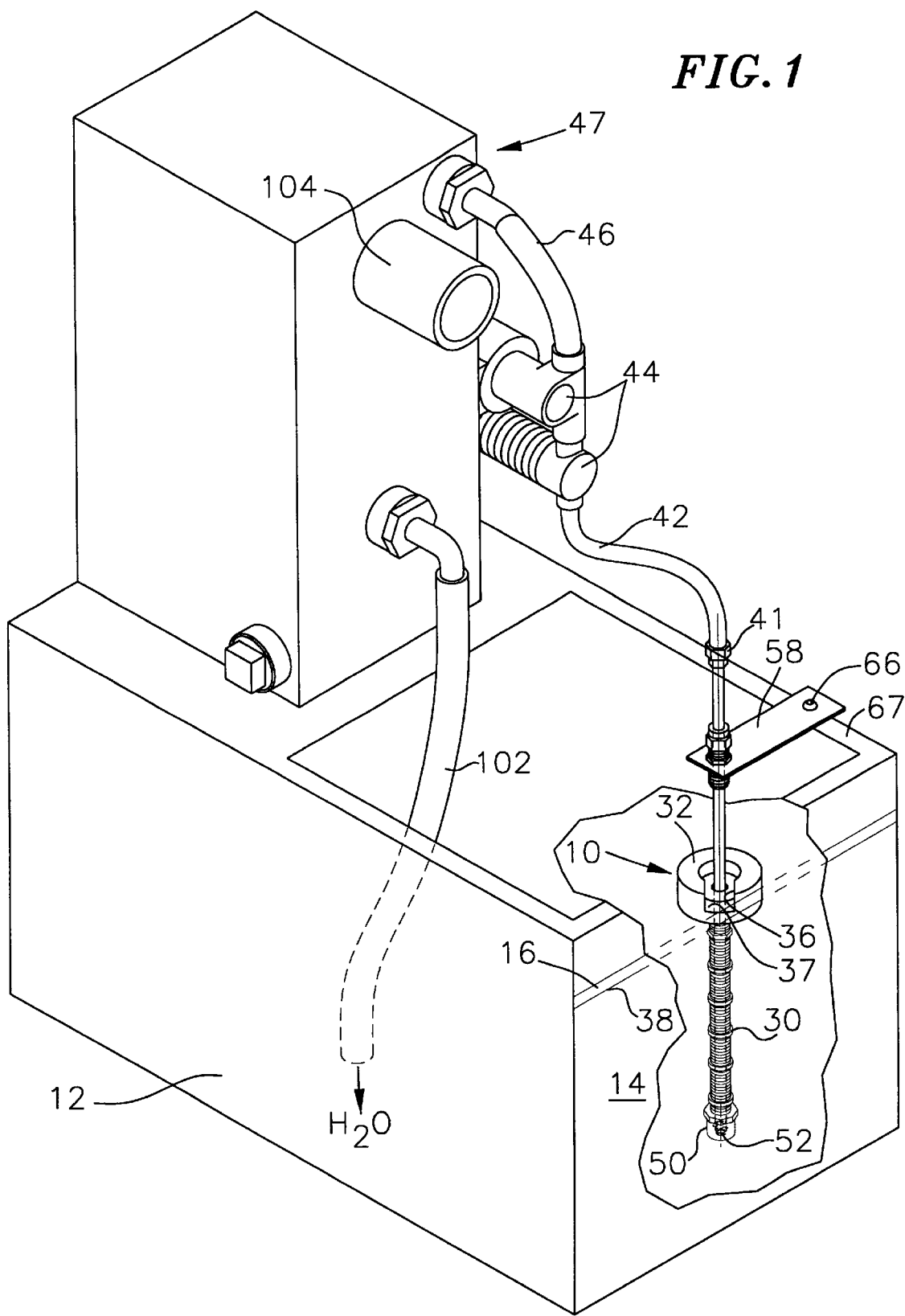
FIG. 1 is a perspective view showing the skimmer mounted in a tank containing two immiscible liquids which are to be separated.

Referring to FIG. 1, a skimmer 10 is mounted in a tank or sump 12 to float in a body of liquid 14, which includes a lower layer of a heavy liquid, say water, and an upper layer 16 of a lighter liquid, say oil.

The skimmer includes a flotation head 20 in the shape of an upright flat cylinder having a stepped bore 22 (FIG. 3) extending vertically through it. The upper end of the stepped bore includes a relatively large base section 24, which steps down to a smaller bore section 26. Below that is an enlarged bore section 28 (FIG. 6), which is internally threaded to receive the upper end of an externally threaded riser pipe 30. Alternatively, the bore section 28 is smooth, and is press-fitted onto the upper end of riser pipe 30. The external threads on the pipe ensure that the head is firmly secured to the pipe.

Figure 3:
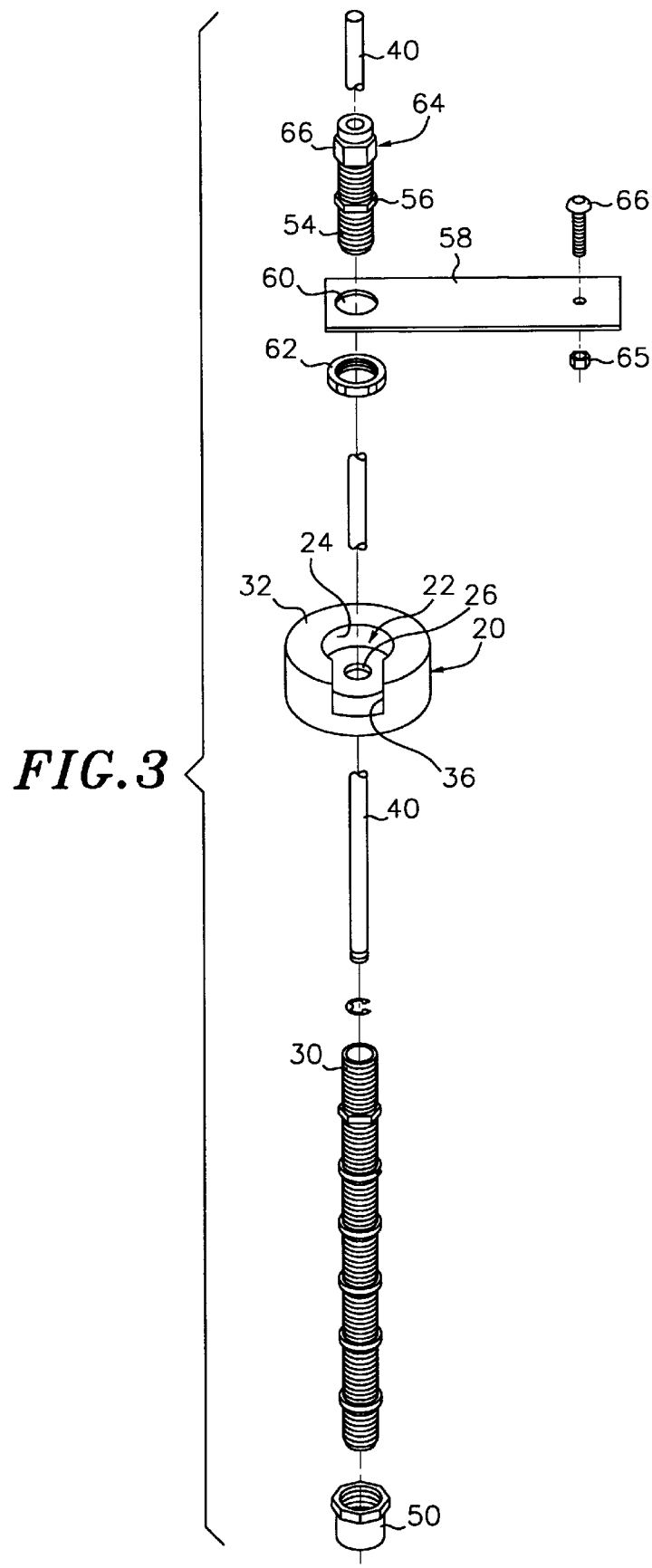
FIG. 3 is an exploded view of the skimmer.
Figure 6:
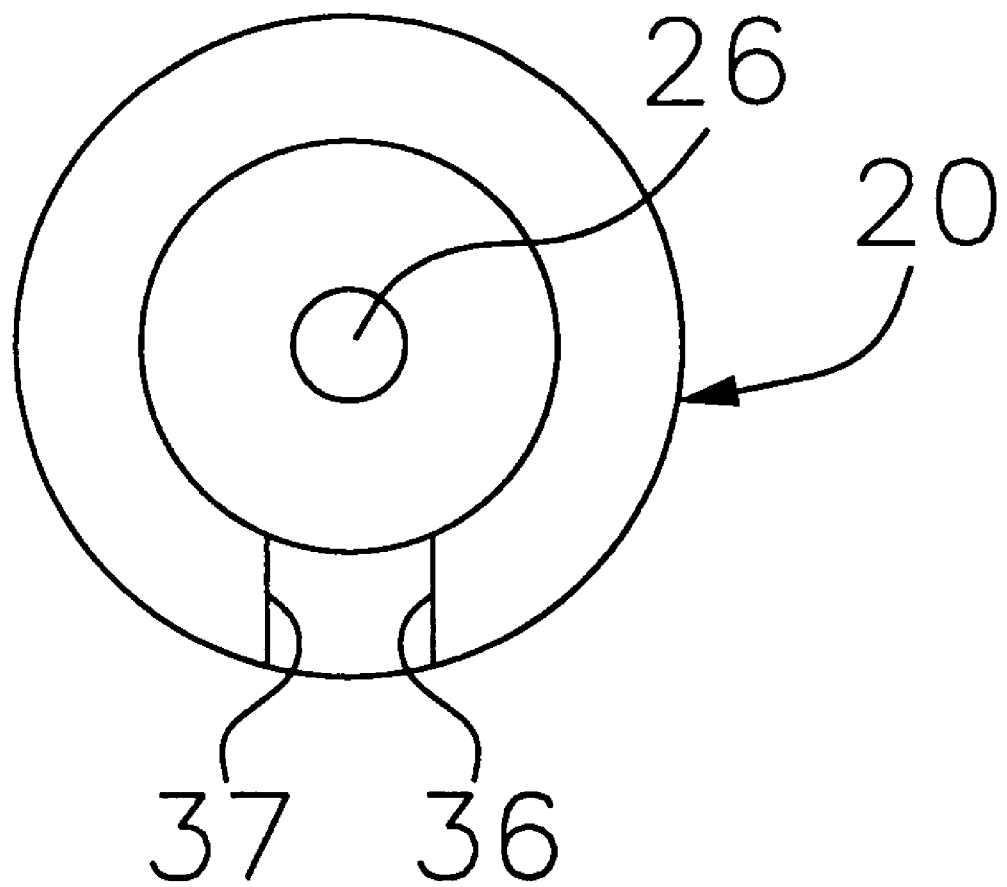
FIG. 6 is a plan view of a flotation head for the skimmer.

As shown best in FIGS. 3 and 6, the stepped bore 22 through the flotation head forms an annular wall 32, which surrounds an upwardly opening cavity having a floor 34, through which the reduced bore section 26 extends.

Figure 2:
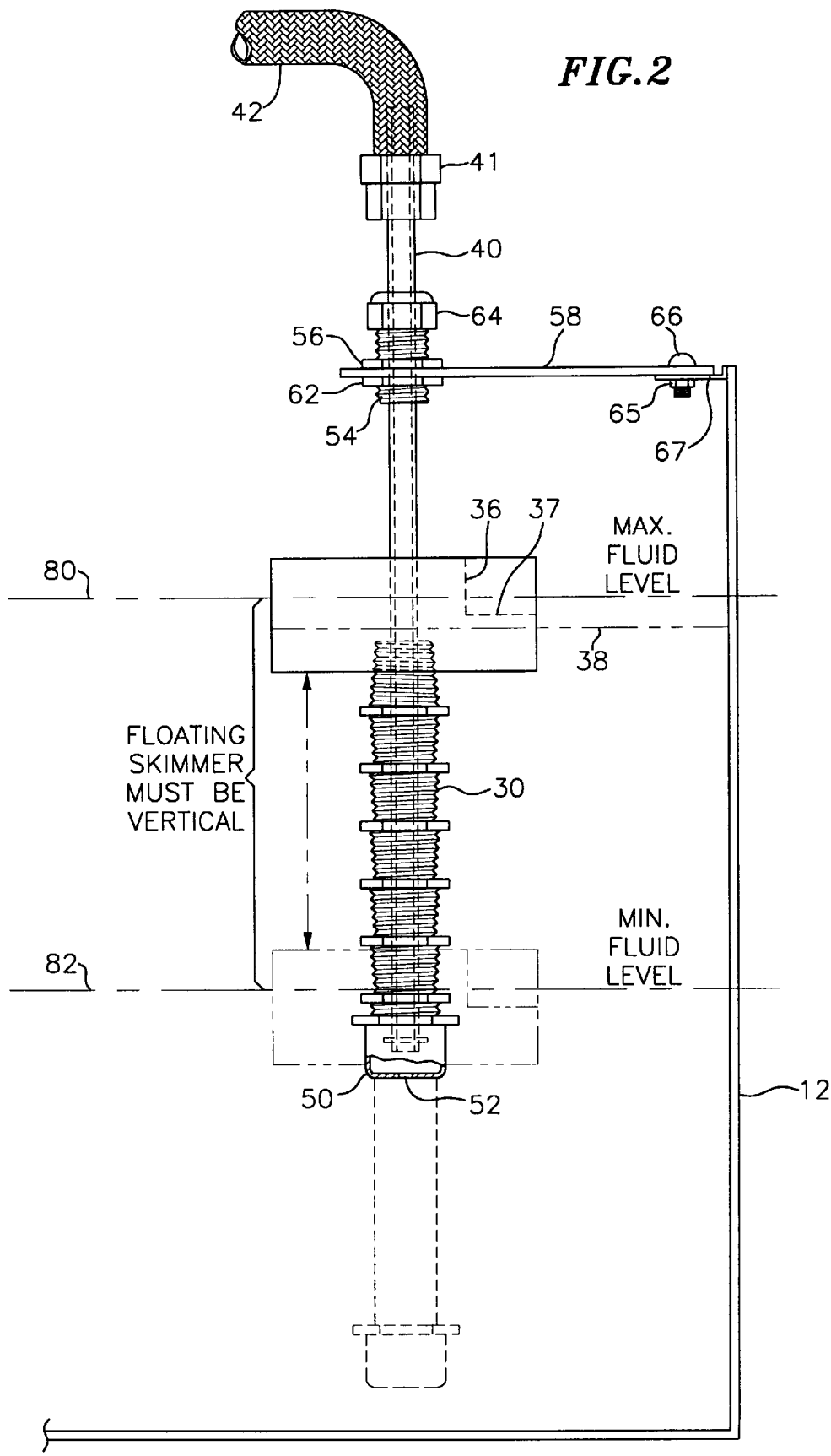
FIG. 2 is an elevation of the skimmer at maximum and minimum liquid levels in the tank.
Figure 7:
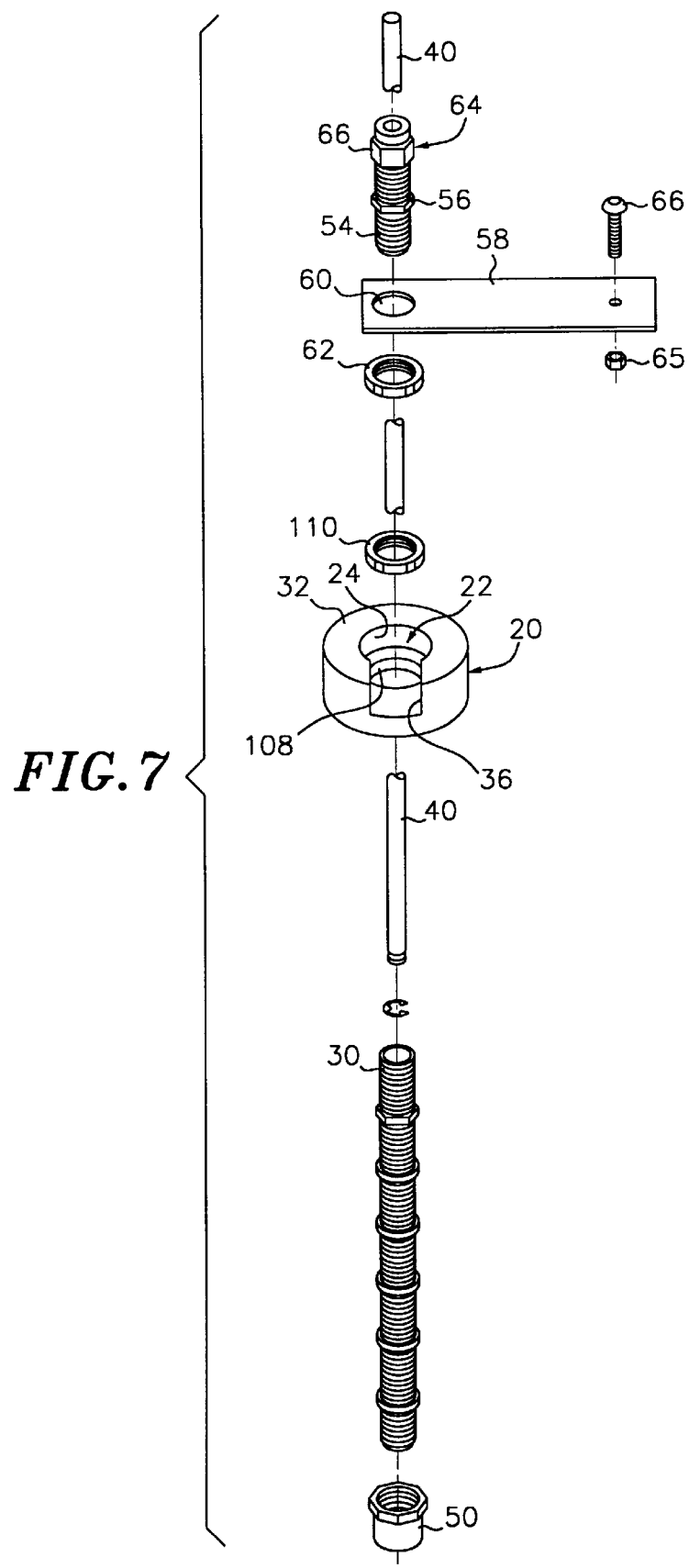
FIG. 7 is an exploded view of an alternate embodiment of the skimmer.

An upwardly opening and radially extending slot 36 extends through the annular wall 32, as shown in FIGS. 1, 3 and 7 so a horizontal bottom 37 of the slot is at the interface 38 of the oil and water layers as shown in FIG. 2.

A vertical copper suction tube 40 extends down from above the flotation head into the riser pipe, and terminates within the lower end of the riser pipe, as shown in FIGS. 1 and 2.

A clamp 41 connects the upper end of the copper tubing to a hose 42, which is connected to the inlet of a pump and strainer assembly 44 (FIG. 1). A discharge hose 46 connects a pump and strainer outlet to the inlet of a separator 47, which may be of the type described in my co-pending U.S. patent application Ser. No. 08/644,241 filed May 10, 1996.

The lower end of the riser pipe is closed by an internally threaded cap 50, which includes a vertical orifice 52 extending through the cap as shown in FIG. 2.

A portion of the copper tubing above the floating head extends up through an externally threaded nipple 54, which carries an external upper locking nut 56, which rests on a horizontal mounting bracket 58 having a vertical bore 60 extending through it to receive a lower portion of the externally threaded nipple 54. A grip nut 62 is threaded onto the lower end of the nipple to bear against the bottom surface of the mounting bracket and hold the nipple in a fixed position, which can be adjusted vertically by setting the upper locking nut and grip nut to the required positions on the nipple. A half-inch NPT tubing grip 64 is mounted on the upper end of the nipple 54, around copper tubing 40 which is clamped in any desired position with respect to the tank bottom and the horizontal mounting bracket, which is secured by a nut 65 and bolt 66 to an inwardly extending flange 67 on an upper edge of the tank 12.

Figure 4:
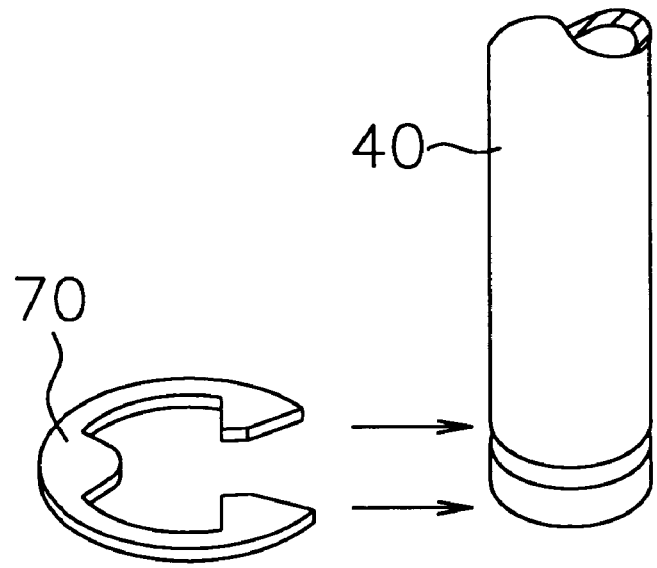
FIG. 4 is an enlarged fragmentary view of parts of the skimmer.
Figure 5:
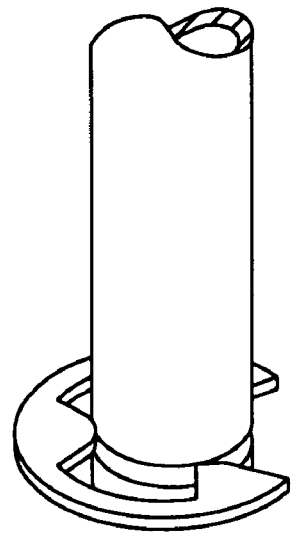
FIG. 5 is an enlarged fragmentary view of a clip mounted on the lower end of a suction tube.

The skimmer is assembled in the tank 12 as shown in the drawings. Referring to FIG. 4, an "E-ring" retainer clip 70 makes a snap fit onto an external annular groove 72 around the lower end of the copper tubing 40 to prevent the skimmer head from sliding off the lower end of the copper tubing because the clip is larger than the small bore 26 in the flotation head. FIG. 5 shows the E-ring retainer clip in the proper position on the lower end of the copper tubing. Alternatively, the internal diameter of the upper end of the riser pipe may be stepped down to be slightly less than the outside diameter of the clip.

The flotation head is made of lighter-than-water, ultra-high molecular weight polyethylene. The riser pipe is made of conventional ¾" by 6" polyvinyl chloride pipe. The cap is also ¾" size, and made of polyvinyl chloride. The buoyancy of the riser pipe is about neutral, and the cap is slightly heavier than water. Therefore, the assembly floats vertically with only the very top of the flotation head out of the water-and-oil mixture. The head, riser pipe, and cap float up and down as the liquid level changes in the tank. FIG. 2 shows how the head, riser pipe and cap move from a maximum fluid level 80 (solid line position) to a lower or minimum fluid level 82 (dotted line position). The head, riser pipe and cap are dimensioned so that, as shown in FIG. 2, the bottom surface 37 of the slot 36 lies at the interface 38 between the oil and water layers.

In operation, the pump is turned on to suck liquid from the lower end of the container and up through the copper tube. This reduces the pressure in the annular space between the riser pipe and the copper tube so that oil and a small amount of water flow through the slot and down around the exterior of the copper tube, which has an exterior diameter slightly smaller than the diameter of the small bore 26 extending through the flotation head. Oil and water flow into the lower end of the copper tube, and are delivered by the pump into the separator for quantitative separation of oil and water.

In short, the head, riser pipe and cap form a elongated upwardly opening container which has an upper portion with a specific gravity less than water, and a lower portion with a specific gravity greater than water. The bottom of slot 36 forms an upper edge of the container over which liquid can flow into the container and out the suction tube. In operation, both oil and water at the interface between those two liquids flow through the slot and to the separator. This minimizes the time that oil is in contact with the water phase (which often contains an expensive coolant), and thereby decreases the likelihood of degradation of coolant by tramp oil.

After water and oil are separated in the separator, water is returned through a discharge hose 102 to the tank. Oil is removed from an oil overflow outlet 104.

As oil is removed from the tank, the fluid level in the tank gradually falls to the minimum level 82, and the flotation head follows the liquid level down to maintain the same relative position between the oil-water interface and the slot at all times.

The ⅜" copper tubing is made of soft copper, allowing the operator to bend it easily into the desired shape needed to fit a particular installation. The mounting bracket is 16-gauge hot-rolled carbon steel, which is stiff, but also easily bent to desired angles for different installation requirements.

The ¾"×6" PVC riser pipe is easily cut to the desired length because of the different preset segments. The riser pipe is a conventional type used in lawn sprinkler applications, and is made by ORBIT.

The orifice 52 in the ¾" PVC cap on the lower end of the riser pipe keeps the skimmer from ever being pumped dry, and avoids the flotation head from floating too high in the liquid, which could place the bottom of the slot above the top surface of the liquid in the tank. Thus, the orifice in the PVC cap stabilizes the flotation level, and thereby keeps the floor of the slot at the required flotation with respect to the oil-water interface, as shown in FIG. 2. The pumping rate is matched to the dimensions of the cap orifice, copper tubing and riser pipe so the skimmer operates as described above. Preferably, the diameter of the orifice is fairly large, say between ¼" and ½" to avoid plugging.

The embodiment shown in FIG. 7 is substantially identical with that of shown in FIG. 3, except that the enlarged bore section 28 is smooth rather than being internally threaded. Moreover, the smaller diameter 26 is enlarged to a slightly greater diameter 108. A riser nut 110, which has an external diameter slightly greater than bore 108 is adapted to be threaded on to the upper end of the externally threaded raiser pipe which extends up through the bore 108.

I claim:

1. Apparatus for skimming liquid from the surface of a body of liquid which includes a lighter liquid floating on a heavier liquid, the apparatus comprising:

an upwardly opening container having a shape and density which causes the container to float in the body of liquid with an upper edge of the container in the vicinity of the interface between the lighter and heavier liquids;

an elongated suction tube having a substantially vertical longitudinal axis and a lower end extending down into the container, the lower end of the tube being open below the upper edge of the container, and being secured at a fixed distance above the bottom of the body of liquid;

the tube and container being free to move vertically relative to each other along a vertical axis substantially collinear with the longitudinal axis of the suction tube; and means for connecting an upper end of the tube to a source of suction so liquid is withdrawn from the container through the tube so that the upper edge of the container remains in the vicinity of the interface between the two liquids.

2. Apparatus for skimming liquid from the surface of a body of liquid which includes a lighter liquid floating on heavier liquid, the apparatus comprising:

an upwardly opening container having a shape and density which causes the container to float in the body of liquid with an upper edge of the container in the vicinity of the interface between the lighter and the heavier liquids;

an upper portion of the container having a specific gravity less than that of water and a lower portion of the container having a specific gravity greater than that of water;

an elongated suction tube having a lower end extending down into the container, the lower end of the tube being open below the upper edge of the container; and means for connecting the upper end of the tube to a source of suction so liquid is withdrawn from the container through the tube so the upper edge of the container remains in the vicinity of the interface between the two liquids.

3. Apparatus for skimming liquid from the surface of a body of liquid which includes a lighter liquid floating on heavier liquid, the apparatus comprising:

an upwardly opening container having a shape and density which causes the container to float in the body of liquid with an upper edge of the container in the vicinity of the interface between the lighter and the heavier liquids, a submerged portion of the container having an orifice opening through it;

an elongated suction tube having a lower end extending down into the container, the lower end of the tube being open; and means for connecting an upper end of the tube to a source of suction so liquid is withdrawn from the container through the tube so that the upper edge of the container remains in the vicinity of the interface between the two liquids.

4. Apparatus according to claim 1, 2 or 3 in which an upper portion of the container contains an upwardly opening slot which has a bottom that forms the upper edge of the container in the vicinity of the interface between the lighter and heavier liquids.

5. Apparatus according to claim 1, 2, or 3 which includes cooperative retainer means on the tube and the container to prevent the container from sliding down off the lower end of the tube.

6. Apparatus according to claim 1, 2, or 3 in which the lower end of the container is externally threaded and a cap is threaded onto the lower end of the container.

7. Apparatus according to claim 6 in which includes a substantially vertical orifice extending through the cap to admit liquid to the container interior.

8. Apparatus according to claim 1, 2 or 3 in which the container is elongated in a vertical direction.

9. Apparatus according to claim 1, 2 or 3 in which the length of the container in a vertical direction is at least several times greater than the internal diameter of the container.

10. Apparatus according to claim 1, 2 or 3 which includes a bracket secured to the suction tube, and adapted to be connected to a tank which contains the body of liquid.

11. Apparatus according to claim 10 which includes means for adjusting the height of the lower end of the suction tube above the bottom of the tank.

\* \* \* \* \*